Dec. 27, 1966 L. HUNTER 3,294,368
VEHICLE WHEEL TOE-IN SETTING DEVICE
Filed Sept. 10, 1965
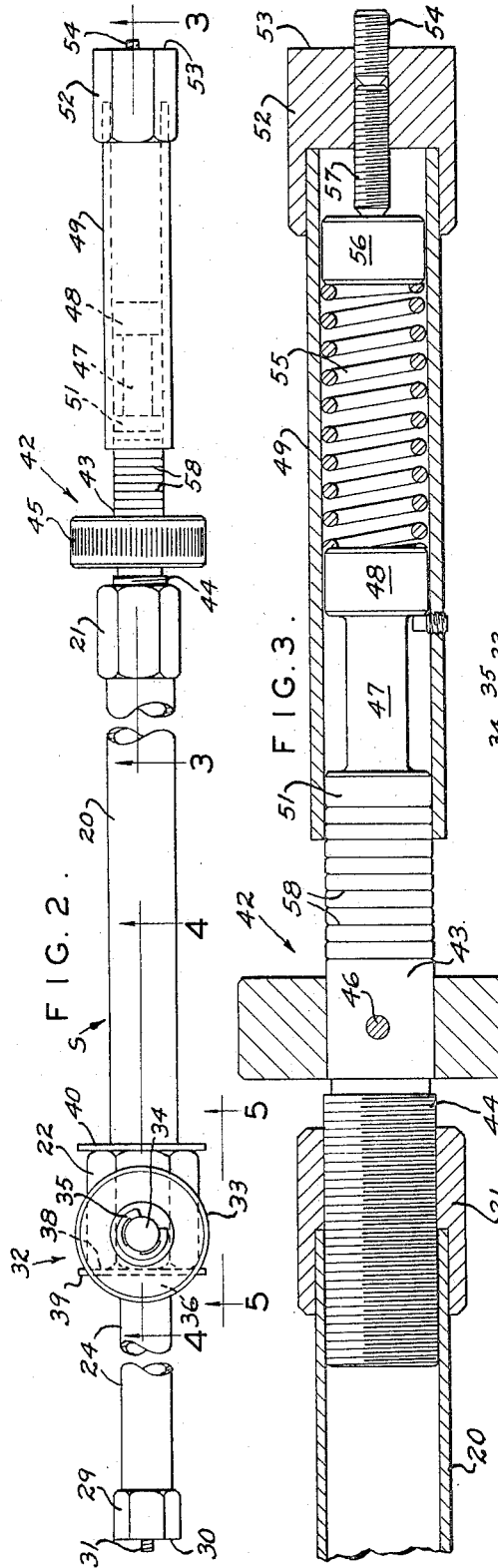
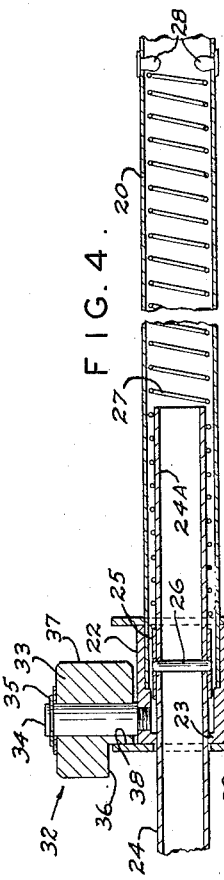
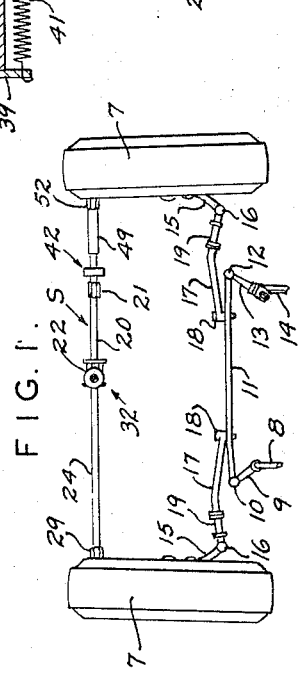
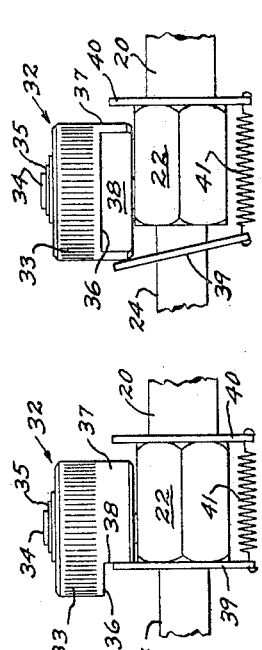
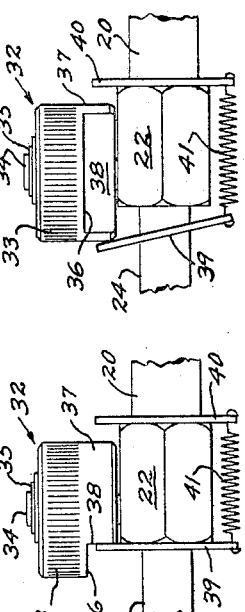
INVENTOR.
LEE HUNTER
BY
Gravely, Lieder & Woodruff
ATTORNEYS

United States Patent Office 3,294,368
Patented Dec. 27, 1966

3,294,368
VEHICLE WHEEL TOE-IN SETTING DEVICE
Lee Hunter, Rte. 1, Box 136, Creve Coeur, Mo. 63141
Filed Sept. 10, 1965, Ser. No. 486,314
5 Claims. (Cl. 254—100)

This invention relates to vehicle wheel toe-in setting devices useful for imposing a counter toe-in force on the steerable wheels of vehicles when making toe-in corrections to restore the recommended toe-in setting.

In the geometry of steerable vehicle wheels the wheels are given a desired degree of toe-in which the distance between the front portions of the wheels is less than the distance between the rear portions. The measurements are usually taken at the level of the horizontal diameter of the wheels to avoid inaccurate results due to the wheel camber and caster geometry. Steerable wheels need to have toe-in so that there will be a natural tendency for the wheels to always seek a straight forward attitude, and so that the wheels will return to a straight ahead position after completing a turn.

The present day vehicles have a great many joints in the steering mechanism and in the wheel mounting means, all of which is subject to wear in the normal function of the wheels to carry the vehicle weight at road speeds and to withstand the forward weight shift in braking, rearward weight shift when accelerating, and side thrust in turns. It is important, therefore, to check the steerable wheel geometry at frequent intervals so that tire wear can be reduced and to maintain the vehicle in a safe condition.

The present invention is primarily directed to providing a simple device for aiding in setting wheel toe-in, and it is a purpose hereof to impose a condition of load on the steerable wheels while toe-in is being adjusted to simulate the forces that are present when the vehicle is in forward motion. Wheel toe-in creates a certain amount of sliding action between the wheels and the road surface. When the wheels are properly adjusted this action tends to cause the wheels to want to seek a straight ahead rolling position. The forces on the wheels while in motion oppose toe-in and impose loads in the steering mechanism. If there is looseness and play in the steering mechanism, as well as in the numerous ball joints and bearings in the wheel mounting assemblies, the forward motion of the steerable wheels will cause a reduction in the desired toe-in or even cause the wheels to reverse geometry and assume a toe-out condition.

Toe-in adjustments are performed under static conditions so that there is no chance to duplicate actual road conditions of forward motion. However, the present device is provided for just that purpose, that is to say the device will substantially reproduce the forces tending to cause the wheels to toe-out, whereby the toe-in adjustment can be made more meaningful to the better operation of a vehicle. Since there are so many joints, bearings and working parts in the steerable wheel mountings and steering mechanism it is difficult to allow for the play conditions while making toe-in adjustments. With the present device, the steerable wheels can be given variable toe-out loadings so that the play in the various parts can be controlled to work only in the direction of improving toe-in and to remain at substantially zero in respect of toe-out conditions. Normally a condition of play in the steering mechanism will allow some slight movement in opposite directions from a given setting of the wheels, but if a force is applied in one direction opposed to the desired wheel setting, the residual play can normally be in the opposite direction which in the case of toe-in will be the direction to slightly increase toe-in.

Accordingly it is a purpose of the present invention to provide a simple device for imposing toe-out forces on steerable wheels while adjusting the wheels for toe-in, whereby play in the steering mechanism is controlled to substantially eliminate its effect on the toe-in adjustment desired.

It is an object of this invention to provide a wheel toe setting device in which variable toe-out force conditions can be simulated to agree with the normal speed of travel of a vehicle.

A further object of this invention is to provide a wheel toe setting device that can be firmly mounted on vehicles having different wheel spacing dimensions and to provide therein separate means to simulate actual road travel conditions for aiding in obtaining desired toe-in settings.

It is another object of the invention to provide a toe setting device with simple means to retain the device in operable position between a pair of steerable wheels while toe-in adjustments are being made, and to incorporate therein other means for substantially eliminating detrimental play conditions.

Other objects of the invention will become apparent from the disclosure of a presently preferred embodiment of the setting device, the same being shown in the accompanying drawings, wherein:

FIG. 1 is a fragmentary plan view of the steerable wheels of a vehicle showing one arrangement of steering mechanism for the wheels, and in which view the present setting device is mounted in its operating position;

FIG. 2 is a longitudinal view of the setting device drawn to a larger scale and having portions broken away for convenience of illustration;

FIG. 3 is a greatly enlarged and fragmentary sectional view of the setting device as seen at line 3—3 in FIG. 2;

FIG. 4 is a fragmentary sectional view taken at line 4—4 in FIG. 2;

FIG. 5 is a fragmentary side view of a portion of the setting device taken at line 5—5 in FIG. 2; and FIG. 6 is a view similar to FIG. 5 but in an adjusted position.

In the plan view of FIG. 1 there is shown a pair of vehicle steerable wheels 7 having a toe-in condition of adjustment. The wheels 7 are steered in response to rotation of the shaft 8 and pitman arm 9. The pitman arm 9 is movably connected by a ball joint device 10 to one end of the cross link 11. The opposite end of link 11 is connected by a ball joint device 12 to the idler arm 13 carried by a bracket 14 attached to the vehicle frame (not shown). The left hand wheel 7 has a steering arm 15 connected by a ball joint device 16 to one end of a drag link 17, the opposite end of drag link 17 being connected to the cross link 11 by a pivot device 18. The right hand wheel 17 is similarly operably connected to the cross link 11 and the various parts are indicated by reference numerals as for the left hand wheel.

Each drag link 17 has an adjustable section 19 for shortening or lengthening the same in order to adjust the toe-in conditions of the wheels 7. In the steering mechanism illustrated the steering arms 15 are directed or trail rearwardly relative to the forward travel of the wheels 7 and are substantially in a plane that passes horizontally through the axis of wheel rotation. The steering mechanism is one of several variations in current use on a great number of vehicles and is illustrative only for purposes of the present disclosure of the setting device shown at S. In the view of FIG. 1 the device S is operably mounted between the inner side walls of the wheels 7 and substantially in the horizontal plane above defined so as to impose a load, as will be noted presently, through the arms 15 upon the ball joint devices and pivots in the steering mechanism. The load thus imposed takes up the play in one direction of movement of these joints, but does not affect the play or backlash in the opposite direction. When adjustments are made in the parts 19 to obtain the desired toe-in for wheels 7, the parts 19 are usually made to push outwardly on steering arms 15 against the load imposed by device S, it being assumed in this description that more toe-in is required. The device S is made to yield in its extended length so that the toe-in adjustment can be made, but in so yielding the device S removes the play in the various parts that would otherwise be present to decrease the toe-in adjustment. Various loads from device S may be obtained to simulate the forward velocity effect on the wheels 7 tending to cause the wheels to go into a straight ahead position or even toe-out. If the vehicle is normally driven at high velocity the outward forces on the front portions of wheels 7 can be simulated by device S so that toe-in adjustments at means 19 will be correct for such condition, and any play in the steering mechanism will be only in the direction tending to increase toe-in which is substantially one-half of the total play that would be present if the device S were not employed.

Having set forth the purposes and objectives of the present invention, attention will now be directed to FIGS. 1, 2 and 3 for an understanding of the construction and operation of the device S. In a preferred form device S consists in a first elongated member 20 having a threaded cap 21 tightly mounted at one end and a body 22 tightly mounted at the opposite end. The cap 21 axially opens into the member 20 for a purpose to appear, and the body 22 is also axially open to receive the member 20 (FIG. 4), but has a radial lip 23 at its outer end. A second elongated member 24 has one end 24A slidably received in the body 22 to extend into the member 20 where a collar 25 is fixed by pin 26 so that the member 24 cannot be separated from member 20 due to the lip 23 on body 22 acting as a stop.

The members 20 and 24 (FIG. 4) are caused to assume extended positions due to a spring 27 being sleeved over the inner end 24A to abut collar 25. The other end of spring 27 abuts a pair of stop pins 28 inserted in member 20. The pins 28 are spaced so that the end 24A of member 24 may if necessary pass between them to allow for shortening the over-all length of members 20 and 24. The outer end of member 24 is provided with a fixed abutment 29 having a flat end face 30 and a set pin 31 adjustably mounted therein to cooperate with the flat face 30 in holding an engaged position on the side wall of wheel 7 (FIG. 1).

In order to control the amount of pressure exerted by the face 30 and pin 31 on the wheel side wall the extension of members 20 and 24 by spring 27 is regulated by a first control means 32 which is operably mounted on the body 22. As seen in FIGS. 2 and 4, the control means 32 has a rotary knob 33 mounted on pin 34 by a snap clip 35. The pin is threadedly mounted in body 22 so that the knob is free to rotate. Knob 33 is formed with a notch 36 directed across a chord so that the circular periphery 37 of the knob is interrupted by the flat chord surface 38. The notch 36 receives a cock-washer 39 loosely sleeved over member 24 so that one side of the washer 39 engages in the notch 36 against chord face 38 and may assume a position flat against the outer end of body 22. A second washer 40 is snuggly sleeved over member 20 to rest flat against the inner end of body 22. The washer 40 serves as an anchor for one end of a spring 41 that has its opposite end engaged in the cock-washer 39 at a point opposite to the notch 36 in knob 33.

In FIGS. 2 and 3 there is shown a second control means 42 consisting of a shaft 43 having its inner end 44 threadedly received in the cap 21 fixed on member 20. The shaft 43 carries a knob 45 fixed thereto by a pin 46 for threading the shaft 44 in and out relative to the cap 21. The outer end of shaft 43 has a reduced diameter section 47 and an end bearing head 48. The bearing head 48 is slidably mounted in a sleeve member 49 and is retained by a set screw 50 so that the sleeve member 49 engages the head 48 and a part of an intermediate section 51 of shaft 43 for adequate bearing purposes. The outer end of sleeve member 49 is tightly received in the fixed abutment 52 formed with a flat end face 53 and a projectiong set pin 54 adjustably mounted therein to cooperate with the flat face 53 in holding an engaged position on the side wall of wheel 7 (FIG. 1).

In the assembly shown in FIG. 3, the sleeve member 49 encloses a spring 55 which at one end abuts the head 48 on shaft 43. Its opposite end bears upon a plug 56 adjustably slidable in the member 49 by means of a screw element 57 threaded into abutment 52 and secured by the set pin 54, as shown. The spring 55 may therefore be given various degrees of compression by adjusting the plug 56 relative to the set screw 50 adjacent the head 48. It can now be seen that rotary adjustment of knob 45 will extend or retract the sleeve member 49 to change the overall length of device S between abutment faces 30 and 53. In addition the sleeve member 49 is movable relative to shaft 43 to change the distance from face 53 to the end cap 21. The intermediate section 51 of shaft 43 which is visible adjacent knob 45 is formed with circular groves 58 which constitute indicia for visually setting the force of spring 55, and the indicia is calibrated in pounds.

In operation, the device S is normally initially adjusted with the shaft 43 threaded into end cap 21 to unload the control means 42. The control means 32 is adjusted to allow the cock-washer 39 to assume the position seen in FIGS. 4 and 5 so that the spring 27 will be free to extend the members 20 and 24 to the full length. Spring 27 is a relatively light spring relative to spring 55 so that initial engagement of abutments 29 and 53 on the wheel side walls will secure the operative position as in FIG. 1. Since set pins 31 and 54 will engage first, the first control means 32 is actuated by rotating knob 33 from the position of FIG. 5 to that in FIG. 6. The action is such that the cock-washer 39 will be canted on member 24 by the periphery 37 of knob 33 pushing on the washer 39 opposite spring 41. As washer 39 binds on member 24 it will obtain a grip and force member 24 to extend or slide out of member 20 so that the flat faces 30 and 53 on the abutments 29 and 52 will engage the wheel side walls. In the drawings the set pins 31 and 54 extend outwardly in an exaggerated showing, and would in actual practice not be so extended.

Having set the device S initially by control means 12 it is now possible to adjust control means 42 to the desired loading by observing the indicia 58. Spring 55 normally imposes a small initial loading which can be increased by turning knob 45 to thread shaft 44 out of the cap 21. This adjustment forces the head 48 into the sleeve member 49 to compress the spring 55, it being understood that the abutment 52 is fixed by the wall of the adjacent wheel 7. The reaction compressing spring 55 is to force an over-all elongation of the device S which absorbs any play in the steering mechanism in one direction thereof. Toe-in adjustments at means 19 will be against the load of spring 55 so that no play can be encountered the effect of which is to decrease toe-in.

The spirit and scope of the present invention will be set forth and defined in the appended claims.

What is claimed is:

1. A vehicle wheel toe-in setting device including first and second members operably telescopically connected at adjacent inner ends, a first abutment element carried at the outer end of said first member, first adjustable means operably carried at the outer end of said second member in axial elongation thereof, a third member having an inner end telescopically mounted on said adjustable means, a second abutment element carried at the outer end of said third member, said third member being axially movable relative to said adjustable means to permit varying the total axial distance between said abutment elements, and second adjustable means between said inner ends of said first and second members to fix the telescoped position thereof.

2. The device of claim 1 wherein said first adjustable means includes a shaft having one end threaded into said second member and an opposite head end telescopingly slidably connected to said third member, a load spring on said third abutting said head end and said second abutment element, and a stop element limiting the sliding of said head relative to said third member.

3. A vehicle wheel toe-in setting device including three elongated members arranged in axial elongation of each other, two of said members engaging in telescoping relation, resilient means between said two members normally elongating the members to a maximum extent, first control means operably connected between said two members to fix said two members in relative elongation less than said maximum extent, second control means adjustably mounted at one end of one of said two members and projecting axially therefrom to an outer head, said third member being axially movably carried by said outer head in axial elongation of said two members, and means between said second control means and said third member permitting axial movement of said third member independently of said two members and said outer head, said second control means operably varying the axial elongation position of said outer head to vary the axial position of said third member.

4. A vehicle wheel toe-in setting device including three axially aligned members, a first one of said members having opposite open ends, a second one of said members having an inner end telescopingly mounted in one end of said first member and an outer end, a first abutment element carried on said outer end of said second member, an adjustable shaft operably carried in the other end of said first member and projecting in axial elongation thereof, the third one of said members having an inner end telescopingly mounted over said projecting shaft and an outer end, a second abutment element carried on said outer end of said third member, said projecting shaft having a bearing head thereon slidably in said third member, stop means on said third member to engage said bearing head and prevent separation from said third member, resilient means between said bearing head and said second abutment forcing said third member axially outwardly to the limit of said stop means, said shaft being operable to adjust the position of said third member in axial elongation of said second member, and a cock-washer device operable mounted adjacent said one end of said first member to grip the adjacent inner end of said second member and fix the axial telescoped position between said first and second members.

5. A vehicle wheel toe-in setting device engaging the side walls of a pair of steerable wheels for imposing an outward load thereon in opposition to toe-in positioning of the wheels to adjust out play in the steering mechanism for said wheels, said device including a first elongated member having one end engaged with the side wall of one wheel and an opposite end, a second member having one end engaging with the side wall of the other wheel and an opposite end, a third member having one end telescoping with the said opposite end of said first member, spring means engaged between said first and third members at said telescoping ends to urge said members relatively outwardly in axial elongation of each other, adjustable means axially operably connecting the said opposite ends of said second and third members, said first and second members being independently movable relative to said third member to permit said device to fit between the side walls of the pair of steerable wheels, a cock-washer carried on one of said first and third members, and cock-washer control means on the other one of said first and third members connected to said cock-washer to selectively position said cock-washer for binding on said first member to hold said first and third members when said device is fitted between the pair of wheels against telescoping and to release said members for telescoping under the urging of said spring means, said adjustable means being operable to force said second and third members in a direction of relative axial extension to impose an outward load on the pair of wheels independently of said spring means.

References Cited by the Examiner

UNITED STATES PATENTS

| 1,681,192 | 8/1928 | McBride. |
| 2,678,803 | 5/1954 | Wilkerson _____ 254—114 |
| 2,820,626 | 1/1958 | Hedeen. |

WILLIAM FELDMAN, *Primary Examiner.*

OTHELL M. SIMPSON, *Examiner.*